March 3, 1931.  R. B. TEWKSBURY  1,794,806
DIESTOCK
Filed Aug. 21, 1928
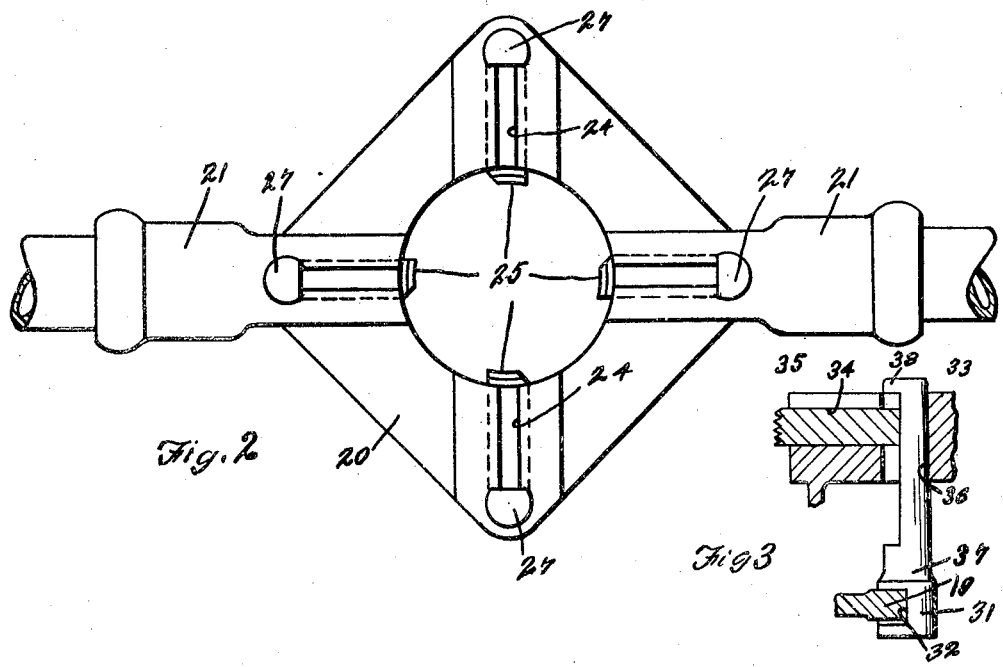
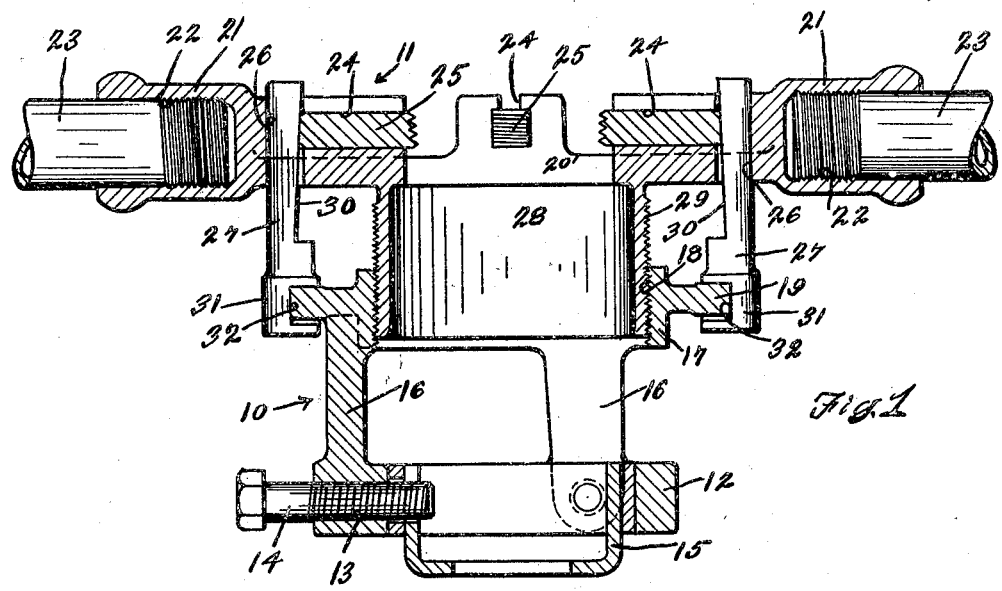
INVENTOR.
Russell B. Tewksbury
BY
Fay Oberlin & Fay
ATTORNEYS.

Patented Mar. 3, 1931

1,794,806

UNITED STATES PATENT OFFICE

RUSSELL B. TEWKSBURY, OF EUCLID, OHIO, ASSIGNOR TO THE OSTER MANUFACTURING COMPANY, OF CLEVELAND, OHIO, A CORPORATION OF OHIO

DIE STOCK

Application filed August 21, 1928. Serial No. 301,119.

The present invention relates, as indicated, to a die stock, and more particularly to a stock of the receding chaser type. The primary object of the invention is to provide a simple and inexpensive, though efficient, die stock of the type indicated. Further objects of the invention will appear as the description proceeds. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:

Fig. 1 is a vertical sectional view through a die stock constructed in accordance with the present invention; Fig. 2 is a plan view thereof; and Fig. 3 is a fragmentary sectional view of a modification.

Referring more particularly to the drawings it will be seen that the device comprises essentially a work holder indicated generally at 10 and a die head indicated generally at 11. The work holder 10 comprises a ring or collar 12 formed with a plurality of screw threaded apertures 13 for the reception of clamp screws 14. As will be obvious said screws are adapted to be turned up to clamp into position a piece of work in the stock. A collar 15 may be inserted in the ring 12 for the obvious purpose. A plurality of webs 16 integrally secure to the ring 12 a second ring 17 internally threaded as at 18. Said ring 17 is formed with an external annular flange 19 the purpose of which will be explained hereinafter.

The head 11 comprises a plate 20 formed with a pair of oppositely projecting socket members 21 interiorly threaded as at 22 for the reception of pipe sections 23 or the like comprising handles. Said plate is formed with a plurality of radially extending slots 24 opening into the bore 20' thereof, and each of said slots is adapted to accommodate a chaser or cutter 25. Said plate is further formed with a plurality of apertures 26 parallel with the axis of the plate and opening, respectively, into the outer ends of said slots 24. Each of said apertures 26 is adapted to accommodate a cam pin 27 for a purpose to be hereinafter stated. Said plate 20 carries or is formed with an annular skirt or sleeve 28 surrounding said bore 20' and projecting axially from the lower surface of said plate. Said sleeve is externally threaded as at 29 for cooperation with the internal threads 18 of the ring 17.

Each of the cam pins 27 is formed on its one side with a cam face 30, said pins being adapted to engage the respective chasers 25. At its lower end, each of said pins is formed with an enlargement 31 which is transversely slotted, as at 32, the slots being formed in the same sides of the pins as are the cam faces 30. As is clearly shown in Fig. 1, the slots 32 in the cam pins 27 receive the flange 19 on the ring 17 of the work holder 10.

In Fig. 3 I have shown a slight modification in which the plate 33 is formed with slots 34 for the accommodation of chasers 35 and with apertures 36, similar to the apertures 26, but of greater diameter. In this modification, the cam pins 37 are formed, as shown, with stop projections 38 at their upper ends. The apertures 36 are of sufficiently large diameter to permit the passage of the pins 37 with their stop projections 38 when the chasers 35 have been moved to such a position that their outer ends do not project into the apertures 36. When, however, said chasers do project into such apertures, as is always the case when a piece of work is in the stock, such projection of the chasers 35 will prevent the passage of the stop projections 38 through the apertures 36, and will thus prevent the complete removal of the plate 33 from its work holder.

The operation of the device will undoubtedly be clear from the above, but a short summary thereof may be given herewith. With the parts in the positions shown in Fig. 1, a piece of work is placed in the stock and clamped in position by means of the screws 14. The operator then grasps the handle 23 and rotates the head 11, it being understood that the work holder 10 is held stationary. Such relative rotation of the head 11, through the screw threads 18—29, causes reciprocation of the head with respect to the work holder. As will be obvious, the cam pins 27 move circumferentially about the work holder 10, being guided by the engagement of the flange 19 in the slots 32. Such engagement prevents reciprocation of the pins 27 with respect to the work holder 10, however, and consequently the chasers 25 move downwardly in Fig. 1 along the pins 27. Since the cam faces 30 of the pins 27 incline outwardly and downwardly in Fig. 1, it will be seen that such movement of the chasers 25 permits recession thereof, and that the operation of the die stock will result in the formation of a tapered thread on the work.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

In a device of the class described, a head, an externally threaded axially extending sleeve on said head, said head being formed with a plurality of radial slots and with a like number of paraxial apertures opening into the outer ends of said respective slots, chasers in said slots, a pin in each of said apertures, each of said pins being formed with a cam face on its inner side and with a transverse slot on its inner side, a work holder having an internally threaded bore adapted to receive said sleeve, and an annular flange on said work holder, said pin slots cooperating with said flange.

Signed by me this 17th day of August, 1928.

RUSSELL B. TEWKSBURY.